United States Patent

Coon

[15] 3,673,252
[45] June 27, 1972

[54] POLYCHLORO AMIDINES AND PROCESS FOR PREPARING THEM

[72] Inventor: Clifford L. Coon, Fremont, Calif.

[73] Assignee: Stanford Research Institute, Menlo Park, Calif.

[22] Filed: Dec. 10, 1970

[21] Appl. No.: 96,979

Related U.S. Application Data

[63] Continuation-in-part of Ser. No. 671,615, Sept. 29, 1967, abandoned.

[52] U.S. Cl. ..................260/564 R, 260/999, 260/648 R, 260/659 R, 260/658 R, 23/219
[51] Int. Cl. ...........................................C07c 123/00
[58] Field of Search ................................260/564 R

[56] References Cited

UNITED STATES PATENTS 3,526,664   9/1970   Coon.....................................260/564

OTHER PUBLICATIONS

Beilstein's Handbuch der Organiche Chemie, Vol. 9 (1926) pp. 836

*Primary Examiner*—Leon Zitver
*Assistant Examiner*—Gerald A. Schwartz
*Attorney*—Urban H. Faubion, James Todorovic and Plumley and Tyner

[57] ABSTRACT

The invention comprises a certain novel class of polychlorinated amidines, more specifically, polychlorinated bis(amidines) useful as chlorinating agents, bleaches, disinfectants, insecticides, and fungicides. The specific class of the subject novel compounds comprises the bis(polychloroamidines) having the structural formula

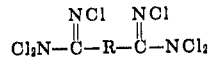

(in which R is an unsubstituted divalent hydrocarbyl radical defined more fully hereinbelow) produced, for example, by treating the corresponding bis(amidines) with sodium hypochlorite under acid conditions, or an aqueous solution of a bis(amidine) hypochloride and excess chloride with fluorine, preferably diluted with nitrogen.

Still another method involves the treatment of an acidic solution of the bis(amidines) of the class set forth herein with gaseous chlorine, this treatment being effected preferably at ambient temperatures and pressures.

3 Claims, No Drawings

3,673,252

POLYCHLORO AMIDINES AND PROCESS FOR PREPARING THEM

This application is a continuation-in-part of the parent application, Ser. No. 671,615, filed in the U.S. Pat. Office on Sept. 29, 1967 now abandoned.

BACKGROUND OF THE INVENTION

1. Field of the Invention

This invention relates to certain novel and useful compounds. More specifically stated, in accordance with one aspect of this invention, certain new polychloro-substituted amidines have been discovered, which are highly effective as chlorinating agents, bleaches, disinfectants, insecticides, and fungicides.

2. Summary of the Invention

The new polychlorinated bis(amidines) of this invention may be represented by the following general structural formula:

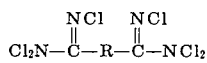

in which the radical R is an unsubstituted divalent hydrocarbon radical selected from the group consisting of an alkylene divalent radical of from one to 10 carbon atoms, a divalent alicyclic radical of from six to eight carbon atoms, and an arylene radical of from six to eight carbon atoms.

Otherwise stated, the novel compounds of the present invention comprise polychlorinated bis(amidines) in which two N, N, N'-trichloro-substituted amidines (i.e. N, N, N'-trichloroguanyl radicals) are directly attached to a divalent alkylene, alicyclic or arylene radical of the group defined and delineated in the preceding paragraph.

The following are illustrative, but not limiting examples of such divalent unsubstituted hydrocarbon radicals:

1. alkylene divalent radicals of one to 10 carbon atoms:
   methylene,
   dimethylene,
   trimethylene,
   1-methyl-dimethylene,
   tetramethylene,
   pentamethylene,
   octamethylene,
   decamethylene;
2. divalent alicyclic radicals of 6 to 8 carbon atoms:
   1,2-cyclohexylene,
   1,3-cyclohexylene,
   1,4-cyclohexylene,
   1-methyl-2,3-cyclohexylene,
   1-ethyl-2,3-cyclohexylene,
   1,4-dimethyl-2,3-cyclohexylene,

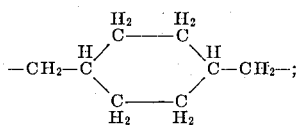

3. arylene divalent radicals, i.e. diradicals of six to eight carbon atoms:
   ortho-phenylene,
   meta-phenylene,
   para-phenylene,
   para-xylylene;

The following are illustrative examples of the novel bis(N,N,N'-trichloro-substituted amidines) of the present invention, which compounds may be produced by the process described below:
   Hexachloromalonamidine,
   Hexachlorosuccinamidine,
   1,3-bis(N,N,N'-trichloroguanyl)-propane,
   1,4-bis(N,N,N'-trichloroguanyl)n-butane,
   1,2-bis(N,N,N'-trichloroguanyl)isobutane,
   Hexachloro-para-phthalamidine,
   1,4-bis(N,N,N'-trichloroacetamidinyl)benzene,
   1,4-bis(N,N,N'-trichloroguanyl)cyclohexane.

As indicated above, and is shown in greater detail hereinbelow, the novel compounds of this class of bis(N,N,N'-trichloroamidines) are all highly effective as chlorinating agents, bleaches and disinfectants.

DESCRIPTION OF PROCESSES

The above-defined class of novel and useful bis(N,N,N'-trichloroamidines) may be produced, as indicated above, by treating the corresponding unhalogenated bis(amidine) with a hypochlorite solution under acidic conditions. More specifically stated, the novel bis(N,N,N'-trichloroamidines) may be prepared effectively, cheaply, and in high yields by contacting the corresponding unhalogenated bis(amidines) with an aqueous sodium hypochlorite solution in the presence of an acid, such as aqueous solution of hydrochloric acid to maintain the reacting mixture in an acidic condition, i.e., at a pH of below 7. It is to be noted that it is essential to maintain the reaction products at a pH below 7, it having been found that when the chlorination reaction described in this paragraph was effected at a pH above 7, one obtained a dichloride instead of a hexachloride; specifically, the bis(amidine) produced was

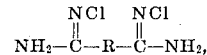

wherein R represents an unsubstituted divalent hydrocarbon radical of the class defined above.

A preferred technique of chlorinating via the process outlined in the preceding paragraph involves stirring a mixture of an aqueous hypochlorite solution over a solvent, such as methylene chloride, chloroform or fluorotrichloromethane, which is capable of selectively dissolving the bis(trichloroamidine) produced, maintaining said hypochlorite solution at a temperature commensurate with the stability of the final product to be produced, and introducing into said solution, preferably slowly, a solution of the bis(amidine) to be chlorinated and an aqueous acid solution, which latter may be hydrochloric acid, or any other acid. Preferably, the bis(amidine) should be introduced into the reaction mixture in the form of its hydrochloride salt, this because the amidine is usually quite hygroscopic. Therefore, the starting amidine should be used in the form of its hydrochloride salt since it is quite stable and also highly water soluble. At the end of the reaction, the final chlorinated amidine may be collected and separated from the solvent.

Another method of preparing the novel bis(N,N,N'-trichloro-amidines) involves contacting of the starting unchlorinated amidines, preferably as their hydrochloride salts, and more preferably in the form of aqueous solutions thereof, with fluorine gas, the starting bis(amidine) hydrochloride being preferably dissolved in water containing a stoichiometric excess of chloride ion. The term "stoichiometric excess of chloride ion" as used herein, is intended to mean that the chloride ions are present in the solution in an amount in excess of that which would or could convert the unsubstituted bis(amidine) to the corresponding bis(N,N,N'-trichlorosubstituted) derivative thereof, i.e., in excess over all of the active hydrogens attached directly to the amidine nitrogens. Although the fluorine gas may be used as such in this oxidative chlorination reaction, it has been found advantageous to dilute it in an inert gas, such as nitrogen. This permits closer control of the reaction. The concentration of the fluorine in the inert gas (e.g. nitrogen) is not critical: it has been varied from as low as 5 percent $F_2$ (or even lower to higher than 35 percent, with very little effect, if any, on the reaction. Also, it has been found that the subject reaction may be conducted at any temperature commensurate with the stability of the final product to be produced. Thus, the novel trichloro-substituted amidines can be produced in high yields when the reaction is effected at low temperatures, e.g. 10° C. or even as low as minus 5° C., or lower; and also at ambient temperatures, or even higher ones. This is also true of the chlorination by the method which involves the use of the hypochlorite which later may be sodium or potassium hypochlorite. As briefly mentioned hereinabove, it is also possible to produce the novel bis(N,N,N'-trichloroamidines) of the present invention by contacting an aqueous acidic solution of the corresponding unchlorinated bis(amidines) with gaseous chlorine, preferably by bubbling the latter through the mentioned acidic solution at ambient temperatures and pressures.

PREFERRED EMBODIMENTS

A more comprehensive understanding of the invention may be obtained by reference to the following examples which illustrate specific embodiments of the manufacture of the novel bis(N,N,N'-trichloroamidines).

Example I Preparation of 1,3-bis(N,N,N'-trichloroguanyl)propane 71.5 ml of a 5.2 percent aqueous solution of sodium hypochlorite was placed in a vessel over 25 ml. of methylene chloride, and the mixture was stirred while being maintained at between about 0° C and about minus 5° C. To this was added dropwise over a period of 15 minutes an aqueous solution of 1.45 g. of glutaramidine hydrochloride and 4.95 g. of 37 percent HCl in 50 ml. of water.

The stirring of the mixture was continued until the aqueous phase became water clear, at which time the methylene chloride layer was separated, dried over sodium sulfate, and the solvent (i.e., methylene chloride) was separated, leaving about 0.49 g. of a light yellow liquid. This liquid was passed through a silica gel column using a 30/70 volume mixture of chloroform and hexane as the eluent. An orange-colored fraction was collected, which on removal of solvent gave 0.20 g. of a light orange liquid. This liquid was identified as 1,3-bis(N,N,N'-triguanyl)propane by its infrared spectrum as well as by an elemental analysis:
Calculated (for $C_5H_6N_4Cl_6$):
C, 17.93; H, 1.81; N, 16.73; Cl, 63.53,
Found:
C, 18.21; H, 83; N, 16.99; Cl, 63.08.

Example II (Preparation of Hexachlorophthalamidine)

A suspension of 0.50 g. of p-phthalamidine dihydrochloride (0.0021 mole) and 1.27 g. of potassium chloride (0.017 mole) in 50 ml of water was placed over 10 ml of chloroform and the stirred mixture was treated with a stream of 10 percent fluorine in nitrogen at 10° until the aqueous phase became clear. The yellow chloroform layer was then removed, and the aqueous phase was extracted twice with 15 ml portions of chloroform. The extracts were combined and dried over magnesium sulfate; the solvent was removed, leaving 0.42 g. of a light yellow solid, m.p. 141°–146°. Recrystallization of this solid from a chloroform-hexane mixture yielded 0.40 g. of hexachloro-p-phthalamidine, m.p. 141°–146°. Recrystallization of this solid from a chloroform-hexane mixture yielded 0.40 g. of hexachloro-p-phthalamidine, m.p. 146°–148°. The compound was identified by its infrared spectrum and elemental analysis; yield, 50 percent.
Calculated for $C_8H_4N_4Cl_6$:
C, 26.03; H, 1.07; N, 15.27; Cl, 57.64.
Found:
C, 26.33; H, 1.12; N, 15.47; Cl, 57.44.

Example III (Preparation of 1,4-bis(N,N,N'-Trichloroacetamidyl)benzene

To a stirred mixture of 37.7 ml of 5.25 percent NaOCl solution over 25 ml of methylene chloride was added dropwise over a period of 12 min. a solution of 1.00 g. of p-phenylenediacetamidine dihydrochloride and 2.62 g. of 37 percent HCl in 30 ml of water. When the aqueous layer was clear, the methylene chloride phase was separated, dried over $Na_2SO_4$, and the solvent removed leaving 1.45 g. of a yellow solid. Recrystallization from a chloroform-hexane mixture gave 1.38 g. of a light yellow crystalline solid, m.p. 97°–98°, which was identified as 1,4-bis(N,N,N'-trichloroacetamidyl)benzene by its infrared spectrum and elemental analysis; yield 92 percent.
Calculated for $C_{10}H_8N_4Cl_6$:
C, 30.25; H, 2.03; N, 14.12; Cl, 53.60.
Found:
C, 30.55; H, 2.08; N, 13.92; Cl, 53.1.

Example IV (Preparation of 1,4-bis(N,N,N'-Trichloroguanyl)cyclohexane)

To 143 ml of 5.25 percent NaOCl solution over 50 ml of methylene chloride was added dropwise with stirring over a period of 15 min. a solution of 3.50 g. of 1,4-diguanyl-cyclohexane dihydrochloride and 3.6 percent of 37 percent HCl in 50 ml of $H_2O$. When the aqueous phase was clear, the yellow methylene chloride phase was separated, dried over $MgSO_4$, and the solvent evaporated, leaving 4.66 g. of a yellow crystalline solid. Recrystallization from a petroleum ether-methylene chloride mixture gave 3.84 g. of 1,4-(N,N,N'-trichloroguanyl)cyclohexane, m.p. 135°–138°. Yield of pure product, 70 percent.
Calculated for $C_8H_{10}N_4Cl_6$:
C, 25.63; H, 2.69; N, 14.94; Cl, 56.74.
Found:
C, 25.82; H, 2.56; N, 15.05; Cl, 56.32.

The bis(N,N,N'-trichloroamidines) of the present invention are stable compounds which can be stored at ambient temperatures for long periods of time without evidence of decomposition. These novel compounds have the property of being extremely reactive towards compounds containing aliphatic or alicyclic carbon-to-carbon double bonds. Thus, when a bis(N,N,N'-trichloroamidine) of the present invention is added, for instance, to cyclohexene, 1-octene, or allyl bromide, a violent reaction is observable, the bis-trichloroamidine acting as a chlorinating agent which adds chlorine to the carbon-to-carbon double bond.

The novel compounds of the present invention also will yield an oxidizing gas (chlorine) when the novel bis amidines are treated with activated charcoal.

Those skilled in the art appreciate that other bis amidines may be treated in accordance with the process described and claimed herein to produce other (but related) novel trichloro substituted amidines.

As many embodiments of this invention may be made without departing from the spirit and scope thereof, it is to be understood that the in invention includes all such modifications as come within the scope of the appended claims.

What is claimed is:

1. A chloro-substituted bis(amidine) having the structural formula

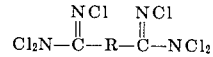

wherein R is an unsubstituted divalent hydrocarbon radical selected from the group consisting of alkylene divalent radicals of from one to 10 carbon atoms, divalent alicyclic radicals of from six to eight carbon atoms, and arylene radicals of from six to eight carbon atoms.

2. A polychlorinated bis(amidine) of the class defined in claim 1 wherein R is an alkylene divalent radical of from one to 10 carbon atoms.

3. 1,3-bis(N,N,N'-trichloroguanyl 1)-propane.

* * * * *